Nov. 13, 1962  L. J. KMIECIK ETAL  3,064,095
LOW WATER CUT-OFF DEVICE
Filed July 20, 1959  2 Sheets-Sheet 1
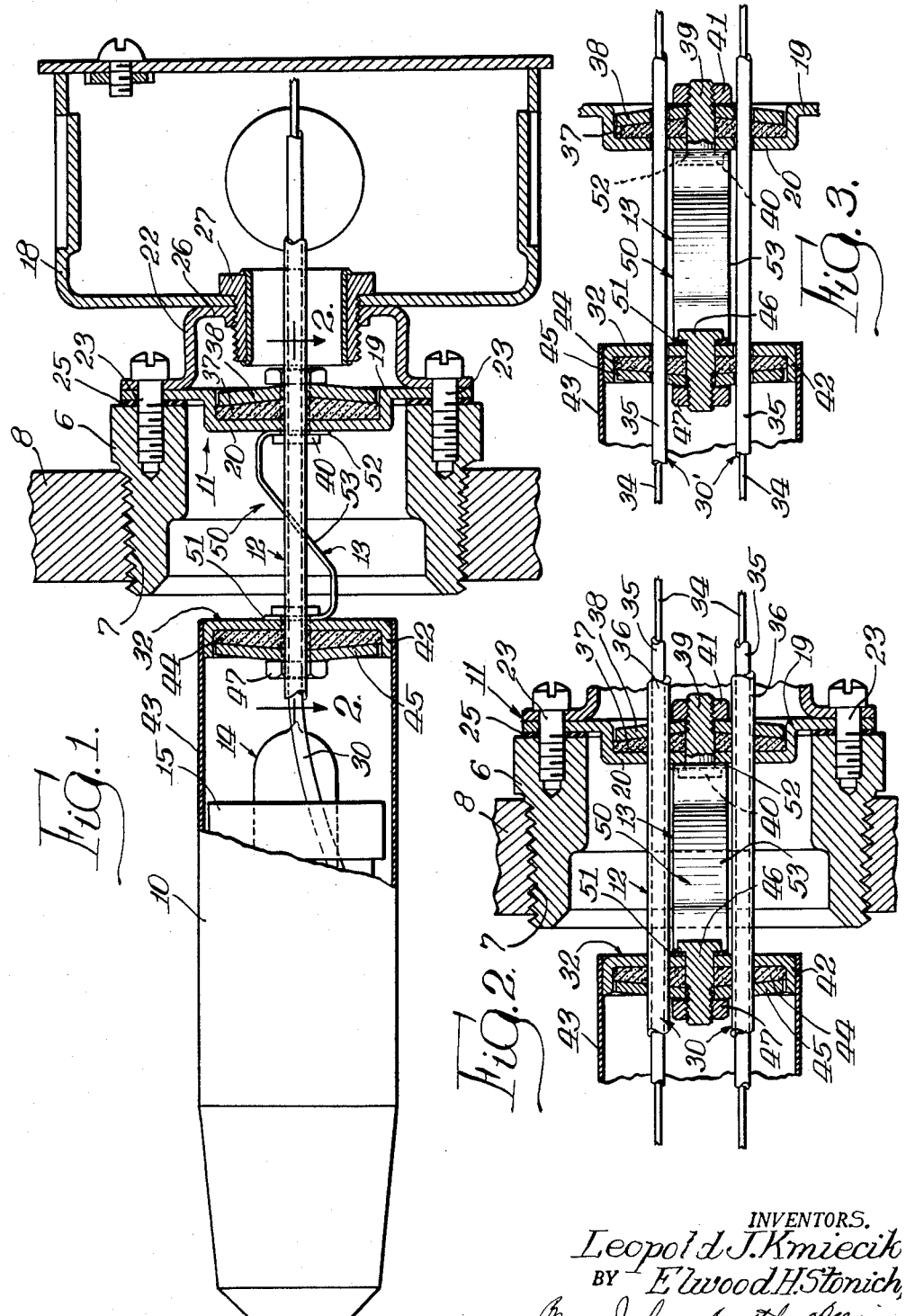
INVENTORS.
Leopold J. Kmiecik
BY Elwood H. Stonich Nov. 13, 1962 L. J. KMIECIK ETAL 3,064,095
LOW WATER CUT-OFF DEVICE
Filed July 20, 1959 2 Sheets-Sheet 2
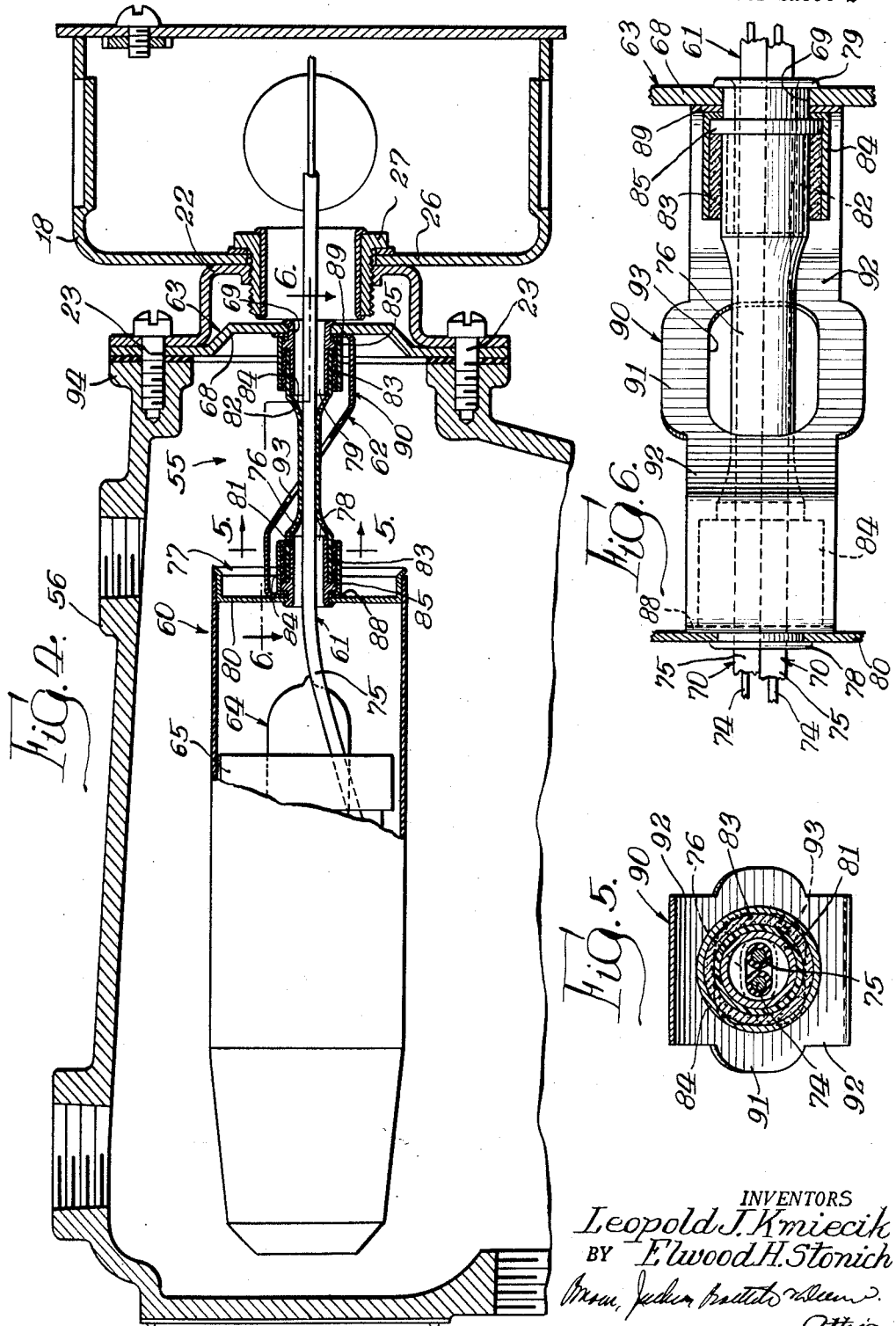
INVENTORS
Leopold J. Kmiecik
BY Elwood H. Stonich United States Patent Office 3,064,095
Patented Nov. 13, 1962

3,064,095
LOW WATER CUT-OFF DEVICE
Leopold J. Kmiecik, Lincolnwood, and Elwood H. Stonich, Chicago, Ill., assignors to McDonnell & Miller, Inc., Chicago, Ill., a corporation of Delaware
Filed July 20, 1959, Ser. No. 828,286
5 Claims. (Cl. 200—84)

Our present invention relates to control devices for boilers and the like and has utility, for example, in a low water cut-off for a boiler.

It is known in the art, typically by way of example in low water cut-off devices, to provide a float movable in response to the liquid level in a float chamber or boiler chamber, and in which the float has enclosed within the same an electrical switch which may be in the form of a tilt mercury switch. The switch within the float means is caused to be actuated at certain positions of the float for controlling the energization or de-energization of control circuit means including control devices, such as water feed apparatus, alarm mechanisms, or the like, as may be desired or required at predetermined positions of the float in its float chamber or boiler. It is essential, for example, in boiler applications within which a float of the character noted is utilized to provide some form of closure means to close off the access opening of the float or boiler chamber, and through which closure means electrical leads from the switch means within the float means extend to provide for connection to an external electrical control circuit. For many years and at the present, such closure means usually comprises a flexible bellows and partition in which the flexible bellows extends between the float in the boiler or float chamber and the inner surface of the partition closing off the access opening of the boiler or float chamber. Electrical leads or other components extend through the bellows from the switch within the float and through the partition so as to be protected from the water in the float chamber or boiler, for suitable electrical connection externally of the partition. In such known arrangements the flexible bellows permits movement of the float with change in liquid level in the float chamber or boiler. Frequently, the aforementioned flexible bellows is also utilized as a pivotal mounting for the float, but in other instances separate pivotal means are provided for the purpose.

One objection to these widely used arrangements lies in the flexible bellows component which, in addition, to being expensive is difficult to fabricate accurately. Even with extreme care in manufacture they frequently possess non-uniform collapsing characteristics so that when utilized as pivotal means for the floats they may present undue difficulties in operation upon pressure variations within the boiler or float chambers in which the floats are located. Additionally, frequent flexing of such a bellows, due to movement of the float, leads to fracture of the bellows, and the fluid seal between the boiler chamber or float chamber and the external electrical connecting means is broken resulting in obvious attendant difficulties occasioned by such circumstance. Further, the incorporation of a flexible bellows adds to the cost of fabricating of control devices in that techniques necessary for securing the opposite ends to the bellows to the float and the closure means involve intricate brazing or soldering operations to afford fluid tight seals or joints, and especially when the control devices are used with boilers operating at high temperatures and pressures.

It is an object of our invention to provide new and unique structures for mounting a float containing an electrical switch in fluid type relation within a float or boiler chamber.

A further object of our invention is to provide in a control of the class indicated comprising a float having switch means therein, partitioning means for closing off a float or boiler chamber in which the float is adapted to be located, insulated electrical leads extending between the partitioning means and the adjacent end of the float, and means for mounting the electrical leads in fluid tight relation at the adjacent end of the float and at the partitioning means.

A further object is to provide in the arrangement last noted spring means extending between the partitioning means and the adjacent end of the float to provide a pivotal support for the float.

A further object is to provide spring means as last noted in which one end portion is disposed above the electrical leads and the other end portion disposed below the leads with an angular intermediate connecting portion connecting the end portions of the spring to provide a pivot axis between the partioning means and the adjacent end of the float for the latter.

A further object is to provide an arrangement as aforementioned in which a pair of insulated electrical leads are disposed to lie in spaced parallel side-by-side relation to afford lateral stability to the float.

A further object is to provide in a control of the class indicated the insulated electrical lead means as aforementioned which include an inner metallic electrical conductor and outer sleeve of material affording the electrical insulation of the inner electrical conductor and characterized by high resistance to corrosion or damage under conditions prevalent in boiler operations.

A further object is to provide a control as last described in which the outer sleeve is in fluid tight relation with respect to the aforementioned partitioning means and the adjacent end of the float means.

A further object of certain embodiments of our invention is to provide an arrangement in which the electrical leads between the float and partitioning means are retained under inward radial compression circumferentially of the portions thereof extending through the partitioning means and the adjacent end of the float.

A further object is to provide in the arrangement last noted, electrical leads characterized by an inner metallic electrical conductor, and an outer sleeve of material affording high resistance to corrosion or damage under conditions prevalent in boiler operations, and together with mounting means to afford for maintaining the portions of the outer sleeve of the electrical leads extending through the partition means and adjacent end of the float means under compression to maintain fluid tight seals thereat.

A further object of certain embodiments of our invention resides in an arrangement in which the aforementioned spring means lies between a pair of electrical leads lying in spaced parallel side-by-side relation.

A further object of another embodiment of our invention resides in an arrangement in which the aforementioned electrical leads extend between the float means and partition and through an opening provided therefor in the spring means.

The above and other objects and advantages of our invention will appear from the following detail description of a preferred embodiment of the invention.

Now in order to aquaint those skilled in the art with the manner of constructing and utilizing devices in accordance with the principles of our present invention, we shall describe in connection with the accompanying drawings, certain preferred embodiments of our invention.

In the drawings:

FIGURE 1 is a longitudinal vertical cross-sectional view of a control device constructed in accordance with the principles of our present invention, with the control shown being adapted for installation directly in the wall of a boiler;

FIGURE 2 is a detail longitudinal horizontal cross-sectional view taken substantially along the line 2—2 on FIGURE 1, and looking in the direction indicated by the arrows:

FIGURE 3 is a detail horizontal cross-sectional view of a structure similar to that shown in FIGURE 2, but utilizing a different form of electrical lead than in the latter figure;

FIGURE 4 is a longitudinal vertical cross-sectional view of another embodiment of control device of our invention, with the control device in this instance associated with a float chamber for a boiler;

FIGURE 5 is a detail vertical cross-sectional view taken substantially along the line 5—5 on FIGURE 4 and looking in the direction indicated by the arrows; and FIGURE 6 is a plan view taken substantially along the line 6—6 on FIGURE 4 and looking in the direction indicated by the arrows.

As indicated above, the control devices of our invention may be optionally adapted for use in a float chamber or directly in a boiler, or otherwise, as dictated by the requirements of the boiler installations to which our invention is to be applied. To illustrate the ready application of our invention to either of the two aforesaid typical kinds of installations, we have shown one embodiment of our invention, as illustrated in FIGURES 1 and 2, mounted directly in a boiler wall, and another embodiment of our invention, as illustrated in FIGURES 4 and 5, mounted in a float chamber which in turn may be mounted in any conventional manner on a boiler.

Referring now to the embodiment of our invention shown in FIGURES 1 and 2 of the drawings, it will be observed that the control assembly there shown includes a known and conventional threaded head or adapter member 6 for threading in an opening 7 in a boiler wall 8. As previously indicated the head member 6 does not constitute an essential element of the control device of our present invention but merely provides for its adaptation in a wall of a boiler. The control device of the embodiment of FIGURES 1 and 2 is composed of a plurality of components including float means 10, partition means 11, electrical lead means 12, and spring means 13 which as will be described provides for the pivotal mounting of float means 10. The float means 10 encloses in fluid tight relation tilt switch means 14, which as previously indicated, may be in the form of a conventional mercury switch supported in any known and suitable manner by bracket 15 within the float. Electrical lead means 12 provides for electrical connection of the switch 14 within the float means through partition means 11 to a known and conventional form of conduit box indicated generally at 18.

In regard to the aforementioned components it will be seen that partition means 11 comprises a circular end plate member 19 formed with a central or cup-shaped recess 20. A conduit box mounting member 22 having an outer peripheral flange is in abutting relation with the outer periphery of end plate member 19 by a plurality of screws 23 having threaded engagement with the head member 6. If desired, and as shown, a suitable sealing gasket 25 is arranged between the adjacent surfaces of head member 6 and end plate 19 to prevent boiler leakage thereat. The conduit box mounting member 22, as shown, is provided with an end wall 26 which receives jamb nut 27 to support conduit box 18 outwardly of head member 6.

The aforementioned electrical lead means 12, as best seen in FIGURE 2, comprises a pair of spaced apart electrical leads 30, 30 which extend into the float means 10 through the closed end 32 thereof for suitable electrical connection with switch 14 and through the partition means 11 to conduit box 18 for suitable external connection. The electrical leads 30 each comprise an inner metallic conductor element 34 encased in a silicone covering or coating 35 which in turn is encased or enclosed within a Teflon tube 36. An important aspect of our invention is to afford for the fluid tight mounting of the aforementioned electrical leads through the closed end 32 of the float means 10 and the partition means 11. To this end wall 19 of partition means 11 is formed with suitable openings through which the Teflon outer tubes 36 of the leads 30 extend, and the cup-shaped recess 20 receives a silicon seal, indicated at 37, and a compression washer indicated at 38. A compression screw 39, best seen in FIGURE 2 formed at one end with an enlarged integral head 40 adapted to bear against cup-shaped portion 20 of wall 19, is held under compression by a compression nut 41 threaded on its other end so as to displace the silicon seal 37 radially inwardly in fluid tight sealing engagement with the outer peripheries of the Teflon tubes 36 of each of the pair of insulated leads 30 and the inner surfaces of the cup-shaped recess 20.

The aforedescribed structure for effecting a fluid tight seal at the partition means is substantially duplicated at the closed end 32 of the float means 10. It will be observed that the latter sealing means comprises an end cup-shaped member 42 secured about its outer periphery in fluid tight relation inwardly of outer metal wall 43 of float 10, a silicon seal 44, compression washer 45, and a compression screw 46 and nut 47 having threaded engagement with the latter for displacing and maintaining the silicon seal 44 under radial inward compression in fluid tight relation with the outer peripheries of the adjacent portion of Teflon tubes 36 of the electrical conductors 30, and the inner surfaces of cup-shaped member 42.

The pair of leads 30 of electrical lead means 12 are preferably disposed, in the normal position of float 10, in side-by-side spaced apart substantially horizontal relation and, in addition, to providing for the electrical connection of switch 14 within float 10 to an external circuit through the conduit box 18, afford lateral stability to the float 10 in its up and down movement. Usually it is not well to rely on electrical lead means 12 to provide a pivot for float 10, and for this purpose we prefer to utilize spring means, such as a flat band spring 50 which is formed with suitable flanged end portions 51 and 52 which are secured centrally of and at end member 42 and wall 19, respectively, by and beneath the enlarged heads of the compression screws 39 and 46. As will be seen, the spring 50 in side elevation is generally S shaped in configuration, having one end portion lying below and the other end portion lying above a substantially normal horizontal plane in which the electrical leads 30 lie in the normal position of the float 10, together with an intermediate connecting portion 53 which passes through the aforementioned substantially horizontal plane of the pair of leads. The spring 50 thus affords a pivot for intermediate its secured end for upward and downward movement of the float in response to change of liquid level in the boiler for appropriate actuation of switch 14. The spring 50 is positioned to lie between the pair of spaced leads 30, and together with the latter provides pivot means for the pivotal mounting of float 10, and affords lateral stability to the float to prevent undue transverse movement due to turbulence in the boiler.

It will be observed in the embodiment above described that the electrical leads 30 extend in fluid tight relation through the closed end 32 of the float and wall 19 of the partitioning means 11. The outer Teflon member of electrical leads 30 is known to be resistant to high temperatures such as encountered in boiler operations and, additionally, is of advantage in that it may be subjected to severe physical abuse without failure or fracture.

However, if desired and as shown in FIGURE 3, the electrical leads 30' of electrical lead means 12 may simply comprise an inner conductor member 34, and the silicon protective coating 35, and eliminating the Teflon protective outer tube or covering 36. Silicon also is an exceptionally good material for affording electrical insulation of the inner conductor, as well as protection of the inner electrical conductor from the fluid content of the device with which the control device is assembled. The reference numerals applied to the structure shown in FIGURE 3 identify parts already described in conjunction with the embodiment of our invention shown in FIGURES 1 and 2.

Referring now to the embodiment of our invention shown in FIGURES 4, 5 and 6, it will be seen that the control assembly 55 is associated with a known form of float chamber 56 formed as a casting and having suitable ports for associating it in known manner with the boiler.

Similarly to the previous embodiments of our invention the control means of the instant embodiment comprises float means 60, electrical lead means 61, spring means 62 and partitioning means 63. The float means 60, as before, encloses in fluid tight relation a tilt switch 64, which may be in the form of a conventional tilt mercury switch is supported by bracket 65 within the float. Also as before, the electrical lead means 61 provides for electrical connection of the switch 64 within the float through partitioning means 63 to a known conventional form of conduit box identical to that previously referred to and indicated at 18.

In the present embodiment the partitioning means 63 comprises a circular end plate members 68 having a central opening 69 through which the lead means 61 extends. A conduit box mounting member 22, as before described is secured with its outer peripheral flange in abutting relation with the outer periphery of end plate member 68 by a plurality of screws 23 having threaded engagement in this instance about flanged opening 94 of the float chamber 56. The conduit box mounting member 22, as before, is provided with an outer end wall 26 which receives jamb nut 27 to support the conduit box 18 outwardly of and at the opening of float chamber 56, into which the control device extends.

Electrical lead means 61 it will be observed comprises a pair of leads 70 which extend into float 60 and through partition 63 for suitable external electrical connection through the conduit box 18. The electrical leads 70 each comprise an inner metallic conductor element 74 encased preferably in a silicone covering or coating 75 which in turn extend through an Teflon sleeve member 76. The outer sleeve member 76 as shown extends between the closed end 77 of the float 60 and the inner surface of the plate member 68 to provide a fluid tight path between the components mentioned for the electrical leads. The manner in which the opposite ends of the outer Teflon 76 are secured to the closed end of the float and partition member 69 is identical in each instance and it will be observed in this regard that tubular brass ferrules 78 and 79 are secured, respectively, to end flange member 80 at the closed end 77 of float 60 and the central portion of plate member 68, by spinning over of the adjacent end portions thereof. The Teflon sleeve 76 at its opposite ends is fitted over the cylindrical shank portions 81 and 82, respectively, of the ferrules 78 and 79 and hollow tubular gaskets or silicone seals 83 surround the opposite ends of the Teflon sleeve. A compression bushing 84 surrounds each of the aforementioned silicone gaskets 83 at the opposite end portions of the Teflon sleeve and provides fluid tight seals between the opposite end portions of sleeve 76 and the outer peripheral surfaces of ferrules 78 and 79. As shown, the brass ferrules 78 and 79 are formed with radially extending annular flanges 85 spaced from the adjacent outer surfaces of the flange member 80 of float 60, and the adjacent outer surface of the central portion of plate member 68 to define with the portions last noted annular recesses or grooves for receiving the opposite flanged ends 88 and 89 of spring 90. As indicated, the opposite ends of spring 90 are retained between the partition member 69 and the flange member 80 and the annular flanges 85 of the brass ferrules 78 and 79 by the peening or spinning over of the outer ends of the latter. The Teflon sleeve 76 thus affords a fluid tight passageway between the partition 69 and the closed end flange member 80 of the float through which the electrical leads extend from switch 64 to conduit box 18 for external electrical connection.

Similar to the embodiments of our invention above described, the spring member 90 has an intermediate portion 91 extending angularly from one end portion of the spring to the other end thereof and intersecting the normal horizontal plane in which the electric leads 70 normally are disposed in the conventional normal position of the float 60 in the float chamber. In the present instance, the spring is provided with its intermediate portion 91 of a width in excess of the width of the opposite ends 92 of the spring and which intermediate portion is formed with an opening 93 through which the electrical leads extend.

In the construction of the embodiment of our invention last described, it will be apparent that the spring means 90 as before provides a pivotal axis intermediate its ends for the float 60 in response to changing liquid level within the float chamber 56, and it in conjunction with the electric lead means 61 imparts lateral or transverse stability to float 60 to prevent undue movement of the parts and retain tilt switch 64 in appropriate position for effecting actuation of an external circuit by tilting of the switch means 64.

While we have shown and described certain preferred embodiments of our invention it will be understood that modifications and rearrangements may be made therein without departing from the spirit and scope of our invention.

We claim:

1. A control device for a boiler or float chamber having an access opening comprising, float means disposed in said chamber, said float means having a closed end, switch means enclosed within said float means, partition means for closing said access opening, electrical lead means extending from said switch means through said closed end of said float means and through said partition means, said electrical lead means comprising an inner electrical conductor element and an outer insulating element, compression seal means for mounting opposite ends of said outer insulating element of said electrical lead means at said closed end of said float means and at said partition means in fluid tight relation, and spring means extending between said closed end of said float means and said partition means affording pivotal mounting of said float means.

2. A control device for a boiler or float chamber having an access opening comprising, float means disposed in said chamber, switch means within said float means, partition means for closing said access opening, a pair of electrical leads extending in parallel side-by-side relation in a substantially horizontal plane between one end of said float means and said partition means, each of said electrical leads comprising an inner electrical conductor element and an outer insulating element, compression seal means for mounting said outer insulating elements of said electrical leads in fluid tight relation at said one end of said float means and at said partition means, and spring means extending from said one end of said float means to said partition means and lying between said pair of electrical leads to afford pivotal mounting of said float means.

3. A control device for a boiler or float chamber having an access opening comprising, float means disposed in said chamber, switch means within said float means, partition means for closing said access opening, a pair of electrical leads extending in parallel side-by-side relation in a substantially horizontal plane from one end of said float means to said partition means, each of said electrical leads comprising an inner electrical conductor element and an outer insulating element, compression seal means for mounting said outer insulating elements of said electrical leads in fluid tight relation in said float means and said partition means, and spring means extending between said one end of said float means and said partition means, said spring means having its end portions lying on opposite sides of said horizontal plane of said electrical leads and having an intermediate portion extending angularly from one end portion to the other end portion of said spring means and through the horizontal plane of said electrical leads to afford pivotal mounting of said float means.

4. A control device for a boiler or float chamber having an access opening comprising, float means disposed in said chamber, switch means within said float means, partition means for closing said access opening, a pair of electrical leads extending in parallel spaced apart side-by-side relation in a substantially horizontal plane from one end of said float means to said partition means, each of said electrical leads comprising an inner electrical conductor element and an outer insulating element, compression seal means for mounting said outer insulating elements of said electrical leads in fluid tight relation in said float means and said partition means, and spring means lying between said electrical leads and having one end connected to said one end of said float means and its other end connected to said partition means, said spring means having portions of its opposite ends lying on opposite sides of said horizontal plane of said electrical leads and having an intermediate portion extending angularly between the opposite ends of said spring means and through the horizontal plane of said electrical leads to afford pivotal mounting of said float means.

5. A control device for a boiler or float chamber having an access opening comprising, float means disposed in said chamber, switch means within said float means, partition means for closing said access opening, a pair of electrical leads extending in parallel side-by-side relation in a substantially horizontal plane from one end of said float means to said partition means, each of said electrical leads comprising an inner electrical conductor element and an outer insulating element, compression seal means for mounting said outer insulating elements of said electrical leads in fluid tight relation in said float means and said partition means, and spring means affording a pivotal mounting for said float means extending between said one end of said float means and said partition means, said spring means having its end portions lying on opposite sides of said horizontal plane of said electrical leads and having an intermediate portion extending angularly from one end portion to the other end portion of said spring means and having an opening through which said electrical leads pass.

References Cited in the file of this patent

UNITED STATES PATENTS

| | | |
|---|---|---|
| 2,136,220 | Shepherd | Nov. 8, 1938 |
| 2,580,759 | Gille | Jan. 1, 1952 |
| 2,588,667 | Stutzman | Mar. 11, 1952 |
| 2,600,659 | Koch | June 17, 1952 |